(12) United States Patent
Shintani (10) Patent No.: US 8,744,253 B2
(45) Date of Patent: Jun. 3, 2014

(54) IMAGE BLUR CORRECTING MECHANISM AND IMAGING DEVICE

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 142 days.

(21) Appl. No.: 13/190,422

(22) Filed: Jul. 25, 2011

(65) Prior Publication Data

US 2012/0020653 A1 Jan. 26, 2012

(30) Foreign Application Priority Data

Jul. 26, 2010 (JP) ................................. 2010-167202
Jul. 13, 2011 (JP) ................................. 2011-154529

(51) Int. Cl.
*G03B 17/00* (2006.01)

(52) U.S. Cl.
USPC ........................................ 396/55; 348/208.11

(58) Field of Classification Search
USPC ........................................ 396/55; 348/208.11
See application file for complete search history.

(56) References Cited

U.S. PATENT DOCUMENTS

| | | | | |
|---|---|---|---|---|
| 2006/0115257 A1* | 6/2006 | Nomura | ........................... | 396/55 |
| 2006/0133786 A1* | 6/2006 | Teramoto | ......................... | 396/55 |
| 2006/0153552 A1* | 7/2006 | Sakata | ............................. | 396/55 |
| 2007/0047936 A1* | 3/2007 | Hirota | .............................. | 396/55 |
| 2007/0182824 A1 | 8/2007 | Nomura et al. | | |
| 2007/0196087 A1* | 8/2007 | Kosaka et al. | .................. | 396/55 |
| 2009/0237792 A1* | 9/2009 | Owashi | ......................... | 359/554 |

FOREIGN PATENT DOCUMENTS

JP 2007-206553 A 8/2007

* cited by examiner

*Primary Examiner* — Clayton E Laballe
*Assistant Examiner* — Fang-Chi Chang
(74) *Attorney, Agent, or Firm* — Shinjyu Global IP (57) ABSTRACT

An image blur correcting mechanism is provided that includes an imaging element, a movable frame, a fixed frame, and first and second actuators. The imaging element has a light receiving face with first and second edges that intersects. The movable frame holds the imaging element. The fixed frame movably supports the movable frame along first and second directions that intersects. The first and second directions are parallel to the light receiving face. The first actuator is configured to move the movable frame in the first direction, and the second actuator is configured to move the movable frame in the second direction. The actuators are positioned on opposing sides of the imaging element, and disposed relative to a first perpendicular plane located perpendicular to the first edge and coincident with the second edge. The actuators are positioned on opposing sides of a second perpendicular plane located perpendicular to the second edge.

9 Claims, 10 Drawing Sheets

IMAGE BLUR CORRECTING MECHANISM AND IMAGING DEVICE

CROSS-REFERENCE TO RELATED APPLICATIONS

This application claims priority under 35 U.S.C. §119 to Japanese Patent Application No. 2010-167202, filed on Jul. 26, 2010 and Japanese Patent Application No. 2011-154529, filed on Jul. 13, 2011. The entire disclosure of Japanese Patent Application No. 2010-167202 and Japanese Patent Application No. 2011-154529 is hereby incorporated herein by reference.

BACKGROUND

1. Technical Field

The technology disclosed herein relates to an image blur correcting mechanism and an imaging device equipped with an imaging element.

2. Background Information

Imaging devices having a mechanism for correcting blurring of an optical image during image capture (hereinafter referred to as an "image blur correcting mechanism") are widely used for the purpose of acquiring a sharp captured image (see, for example, Japanese Laid-Open Patent Application 2007-206553).

An image blur correcting mechanism such as this is usually constituted by an imaging element, a support frame, a first actuator, and a second actuator. The imaging element is fixed to the support frame, and has a light receiving face that receives incident light. The light receiving face includes a first edge and a second edge that intersects the first edge. The support frame is able to move in a first direction along the first edge, and a second direction along the second edge. The support frame is moved in the first direction by the first actuator, and in the second direction by the second actuator, allowing the imaging element to be moved in the first and second directions.

As discussed in the patent literature mentioned above, in general the first actuator is disposed on the outside the first edge of the light receiving face of the imaging element in the second direction, and the second actuator is disposed on the outside the second edge of the light receiving face of the imaging element in the first direction.

With a conventional image blur correcting mechanism, however, neither the position of the first actuator in the first direction, nor the position of the second actuator in the second direction, nor the relative position of the first and second actuators is taken into account. Accordingly, there is still room for improvement in terms of reducing the size of the image blur correcting mechanism and imaging device.

SUMMARY

One object of the technology disclosed herein is to provide an image blur correcting mechanism and imaging device that can be made smaller.

In accordance with one aspect of the technology disclosed herein, an image blur correcting mechanism is provided that includes an imaging element, a movable frame, a fixed frame, and first and second actuators. The imaging element has a light receiving face with first and second edges that intersects. The movable frame holds the imaging element. The fixed frame movably supports the movable frame along first and second directions that intersects. The first and second directions are parallel to the light receiving face. The first actuator is configured to move the movable frame in the first direction, and the second actuator is configured to move the movable frame in the second direction. The actuators are positioned on opposing sides of the imaging element, and disposed relative to a first perpendicular plane located perpendicular to the first edge and coincident with the second edge. The actuators are positioned on opposing sides of a second perpendicular plane located perpendicular to the second edge.

These and other objects, features, aspects and advantages of the mechanisms and/or devices disclosed herein will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure.

DETAILED DESCRIPTION OF EMBODIMENTS

Next, an embodiment of the present invention will be described through reference to the drawings. In the following discussion of the drawings, those portions that are the same or similar will be given the same or similar numbering. The drawings are merely schematics, however, and the dimensional proportions and so forth may differ from those in actuality. Therefore, specific dimensions and so forth should be decided by referring to the following description. Naturally, dimensional relations and proportions may in some portions differ from one drawing to another.

In the following embodiments, a digital camera will be described as an example of an "imaging device." In the following description, "front", "rear", "upper", "lower", "right", and "left" are terms defined using as a reference an imaging device in a landscape orientation and facing a subject straight on. "Landscape orientation" is the orientation of an imaging device when the long-side direction of a rectangular image that is wider than it is tall substantially coincides with the horizontal direction in the image.

First Embodiment

Simplified Configuration of Imaging Device

Figure 1:
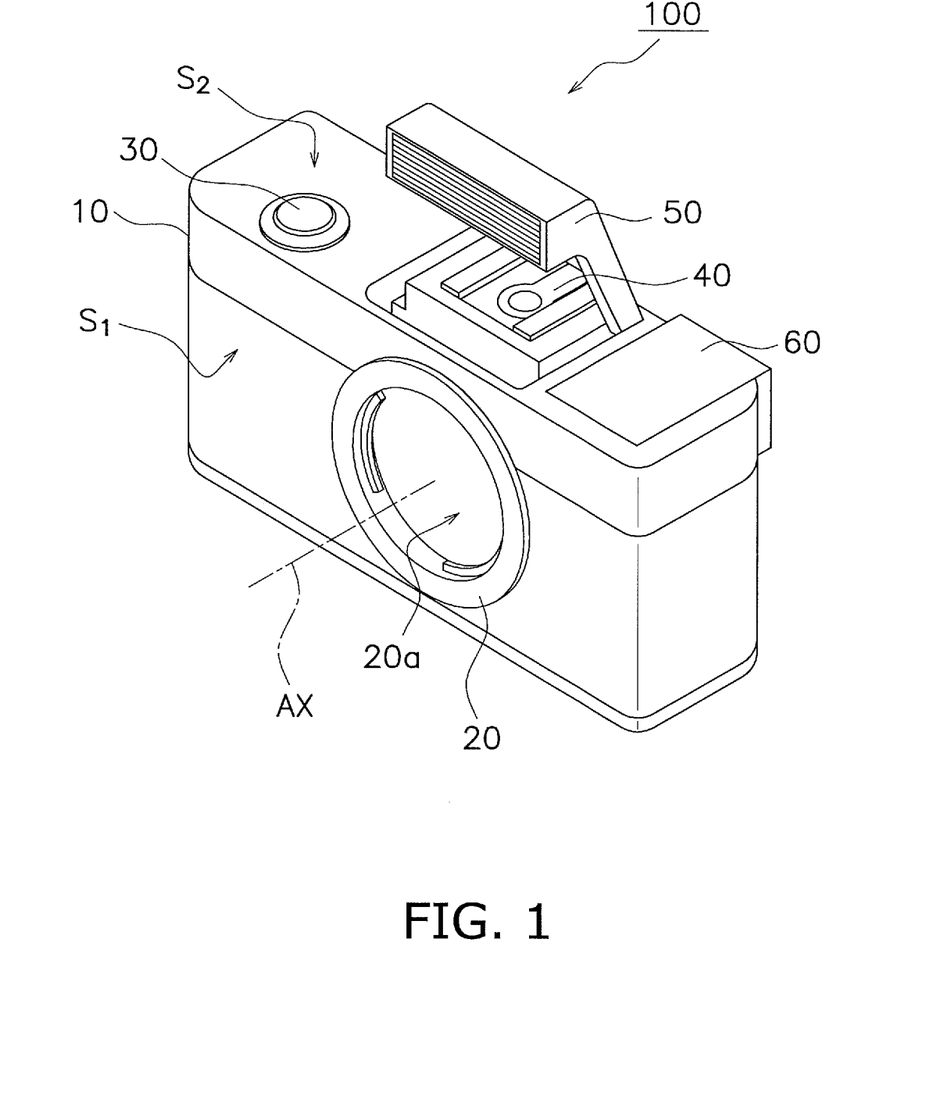
FIG. 1 is an oblique view of an imaging device pertaining to a first embodiment.
Figure 2:
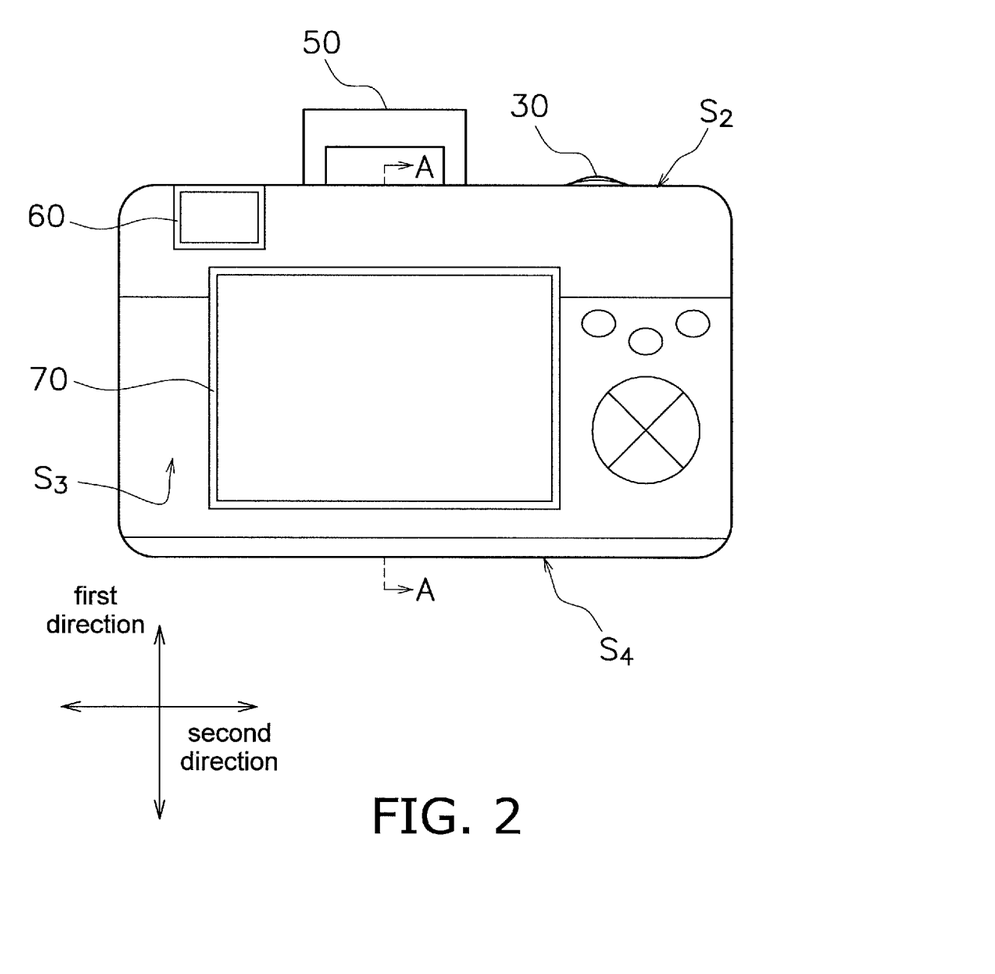
FIG. 2 is a front view of an imaging device pertaining to a first embodiment.

The simplified configuration of the imaging device pertaining to a first embodiment will be described through reference to the drawings. FIG. 1 is a front oblique view of an imaging device 100. FIG. 2 is a front view of the imaging device 100.

As shown in FIGS. 1 and 2, the imaging device 100 comprises a housing 10, a body mount 20, a shutter button 30, a hot shoe 40, a flash emitter 50, an electronic viewfinder 60, and a display device 70.

The housing 10 holds an image blur correcting mechanism 160 (see FIG. 3) and so forth. The housing 10 has a front face $S_1$, an upper face $S_2$, a rear face $S_3$, and a lower face $S_4$.

The body mount 20 is provided to the front face $S_1$ of the housing 10. Various kinds of lens unit (not shown) can be mounted to the body mount 20 by bayonet coupling. The body mount 20 has an opening 20a whose center is the optical axis AX of a lens unit. Incident light from the lens unit is guided through the opening 20a into the housing 10.

The shutter button 30 is provided to the upper face $S_2$ of the housing 10. The user operates the shutter button 30 to open and close the shutter.

The hot shoe 40 is provided to the upper face $S_2$ of the housing 10. A general-purpose attachment (such as a flash emitter) can be mounted to the hot shoe 40.

The flash emitter 50 is provided to the upper face $S_2$ of the housing 10. The flash emitter 50 can be stowed in the housing 10. In FIGS. 1 and 2, a state is shown in which the flash emitter 50 has been pulled out of the housing 10.

The electronic viewfinder 60 is provided to the rear face $S_3$ of the housing 10. The electronic viewfinder 60 displays an image within the range of capture. The user looks at the image displayed on the electronic viewfinder 60.

The display device 70 is provided to the rear face $S_3$ of the housing 10. The display device 70 displays an image within the range of capture, operation menus, and so forth. A liquid crystal display, an organic or inorganic EL device, a plasma display, or the like can be used as the display device 70, for example.

Internal Configuration of Imaging Device

Figure 3:
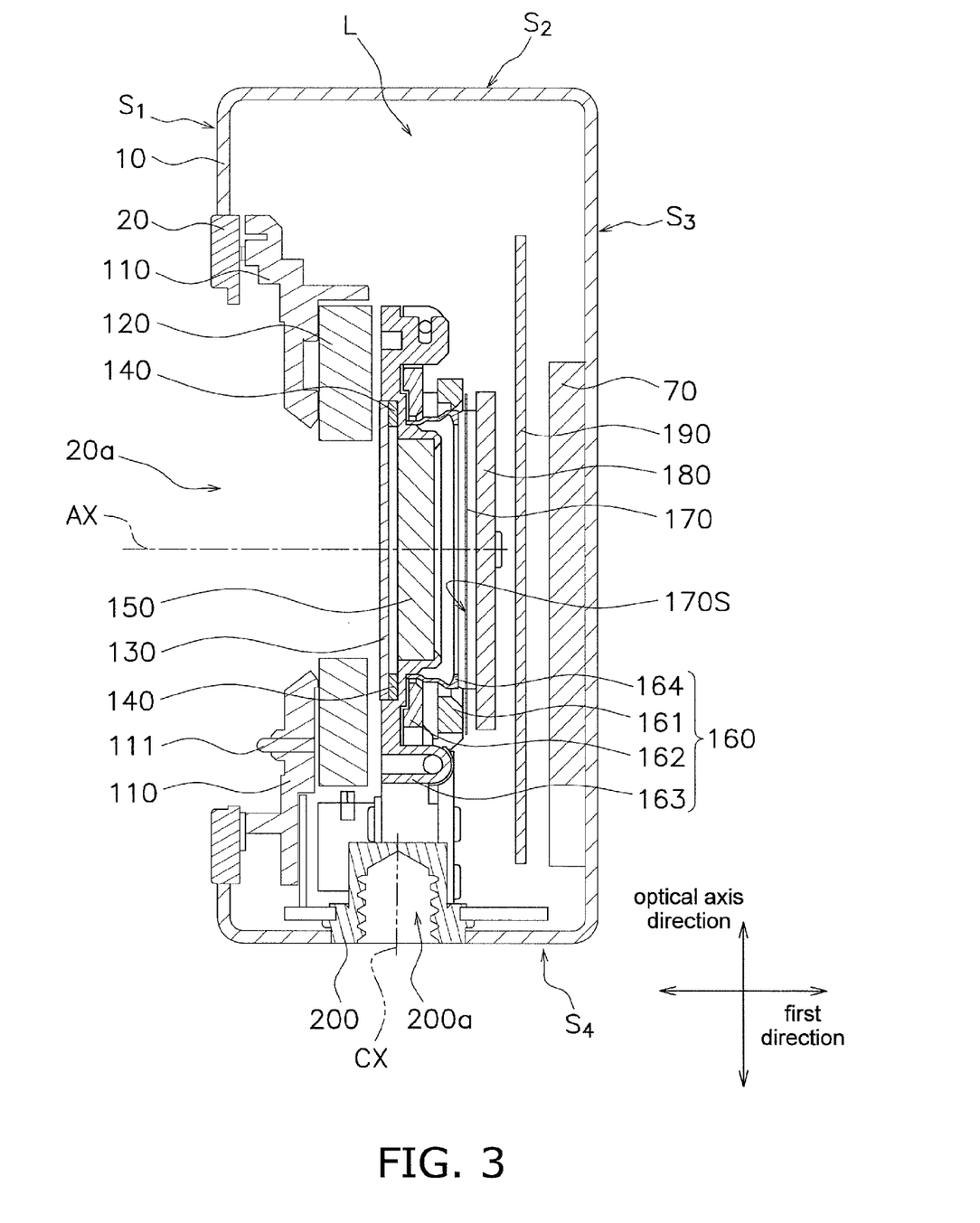
FIG. 3 is a cross section along the A-A line in FIG. 2.

The internal configuration of the imaging device will now be described through reference to the drawings. FIG. 3 is a cross section along the A-A line in FIG. 2.

The imaging device 100 comprises a support body 110, a shutter unit 120, a diaphragm 130, an anti-vibration member 140, a low pass filter 150, an image blur correcting mechanism 160, an imaging element 170, a heat disperser 180, a circuit board 190, and a leg seat 200.

As shown in FIG. 3, with the imaging device 100, a reduction in flange-back afforded by the elimination of a mirror box allows the imaging device 100 and the lens unit to be made smaller.

The housing 10 forms a holding chamber L.

The support body 110 supports the body mount 20. The support body 110 has an electrical contact 111. The electrical contact 111 is electrically connected to the lens unit. The exchange of control signals between the lens unit and the circuit board 190 is performed via the electrical contact 111.

The shutter unit 120 is what is known as a focal plane shutter. The shutter unit 120 is disposed between the support body 110 and the image blur correcting mechanism 160. The shutter unit 120 is driven at a specific shutter speed as required for exposure when the user operates the shutter button 30.

The diaphragm 130 is fixed to the image blur correcting mechanism 160 ahead of the low pass filter 150. The diaphragm 130 reduces the amount of dust that adheres to the low pass filter 150 and the imaging element 170. Also, the diaphragm 130 has a piezoelectric element driven by the application of AC voltage, and a plate-like member driven along with the drive of the piezoelectric element. When the plate-like member is driven, any dust clinging to the diaphragm 130 itself is knocked loose. A anti-fogging layer is formed on the front face of the diaphragm 130.

The anti-vibration member 140 absorbs the vibration of the diaphragm 130, and this reduces the amount of vibration of the diaphragm 130 that is transmitted to the image blur correcting mechanism 160.

The low pass filter 150 is fixed to the image blur correcting mechanism 160 to the rear of the diaphragm 130. The low pass filter 150 removes the high-frequency component of incident light from the lens unit. The low pass filter 150 also functions as an IR cut filter for cutting out infrared light.

The diaphragm 130 may also serve as the low pass filter 150. The image blur correcting mechanism 160 corrects shaking of the imaging element 170. The image blur correcting mechanism 160 has a pitch frame 161, a yaw frame 162, a fixed frame 163, and a dust cover 164. The configuration of the image blur correcting mechanism 160 will be discussed below. In this embodiment, the pitch frame 161 (an example of a first movable frame) and the yaw frame 162 (an example of a second movable frame) constitutes a "movable frame" that is capable of relative movement with respect to the fixed frame 163.

The imaging element 170 is fixed to the pitch frame 161 via the heat disperser 180. The imaging element 170 has a light receiving face 170S that receives incident light from the lens unit. The light receiving face 170S is disposed perpendicular to the optical axis AX of the lens unit. The imaging element 170 converts an optical image provided on the light receiving face 170S into image data. The imaging element 170 can be a CMOS image sensor, a CCD image sensor, or the like. In this embodiment, the image blur correcting mechanism 160 and the imaging element 170 constitute an "image blur correcting mechanism."

The heat disperser 180 is fixed to the pitch frame 161. The imaging element 170 is adhesively bonded to the heat disperser 180. The heat disperser 180 disperses the heat generated from the imaging element 170.

The circuit board 190 has a circuit that controls the drive of the imaging element 170. The circuit board 190 performs specific processing (such as A/D conversion) on the image data from the imaging element 170.

The leg seat 200 is a female threaded member that is recessed in the lower face $S_4$ of the housing 10. The leg seat 200 has a concave portion 200a formed from the lower face $S_4$ of the housing 10 toward the interior of the housing 10. The concave portion 200a is formed in the vertical direction. More specifically, the center line CX of the concave portion 200a is parallel to a direction perpendicular to the optical axis AX and parallel to the light receiving face 170S. The upper end of a leg (such as a tripod or monopod) is threaded into the concave portion 200a.

With the imaging device 100 to which a lens unit can be attached, the leg seat 200 is preferably provided directly under the optical axis AX of the lens unit. Doing this will reduce sudden rotation of the imaging device 100 when the pan head clamp is loosened, even if a heavy lens is mounted to the body mount 20.

Configuration of Image Blur Correcting Mechanism

Figure 4:
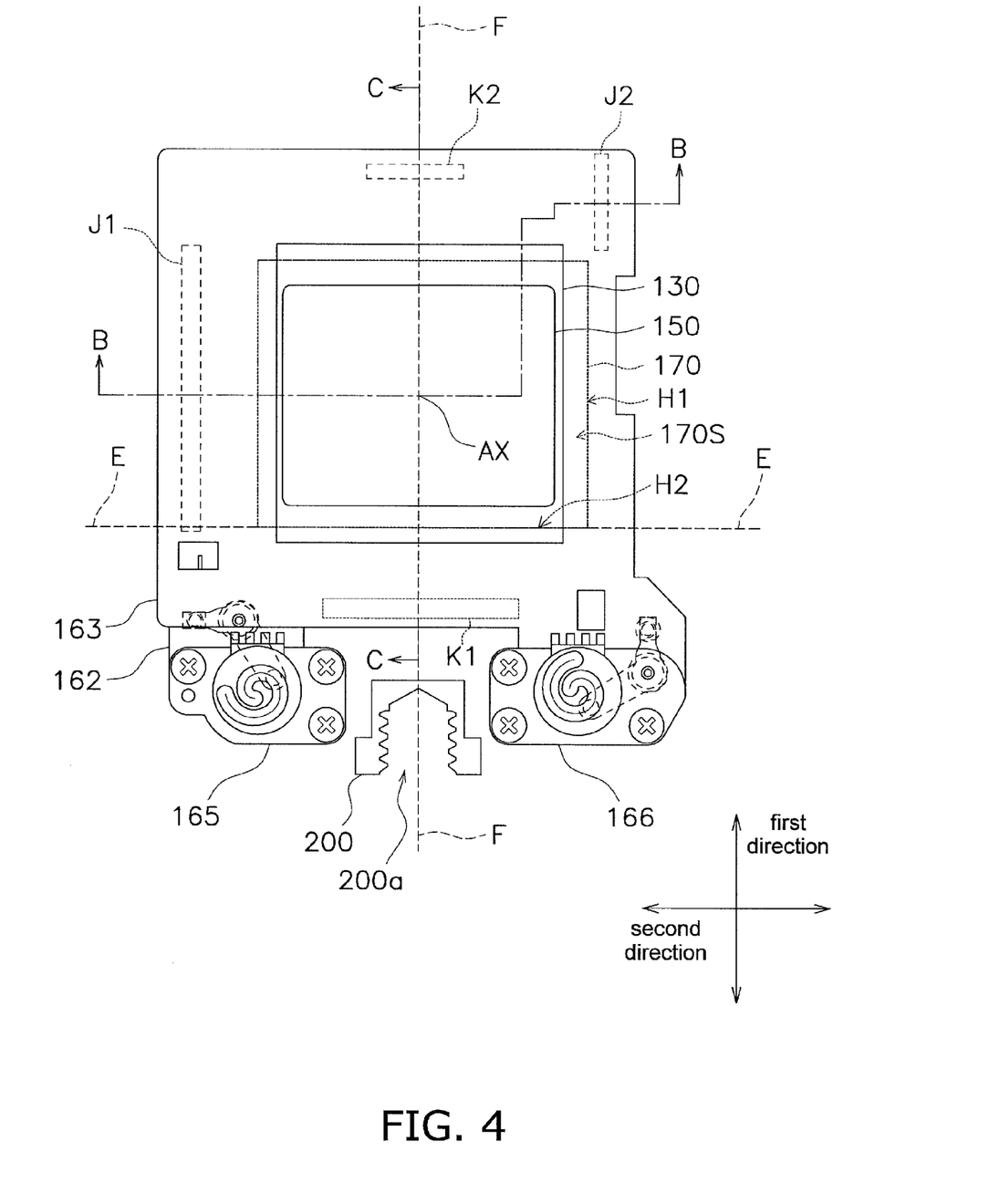
FIG. 4 is a front see-through view of the configuration of an image blur correcting mechanism pertaining to a first embodiment.
Figure 5:
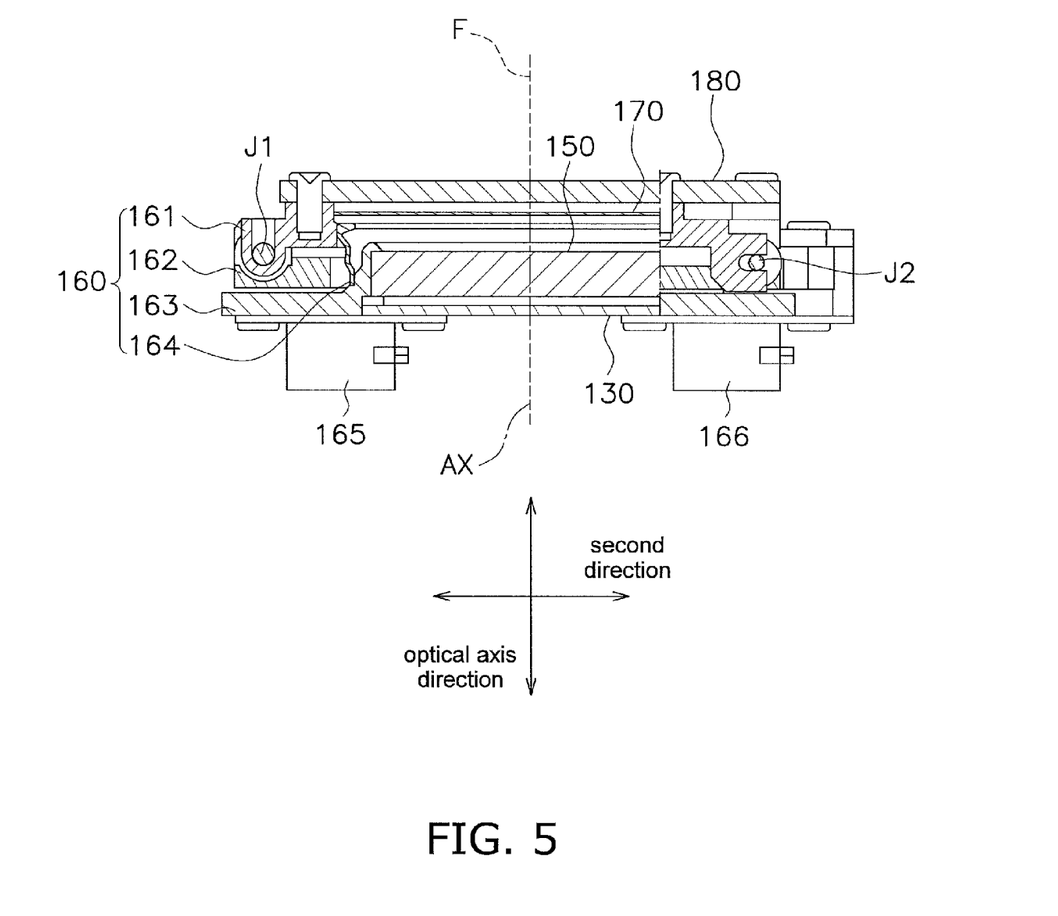
FIG. 5 is a cross section along the B-B line in FIG. 4.
Figure 6:
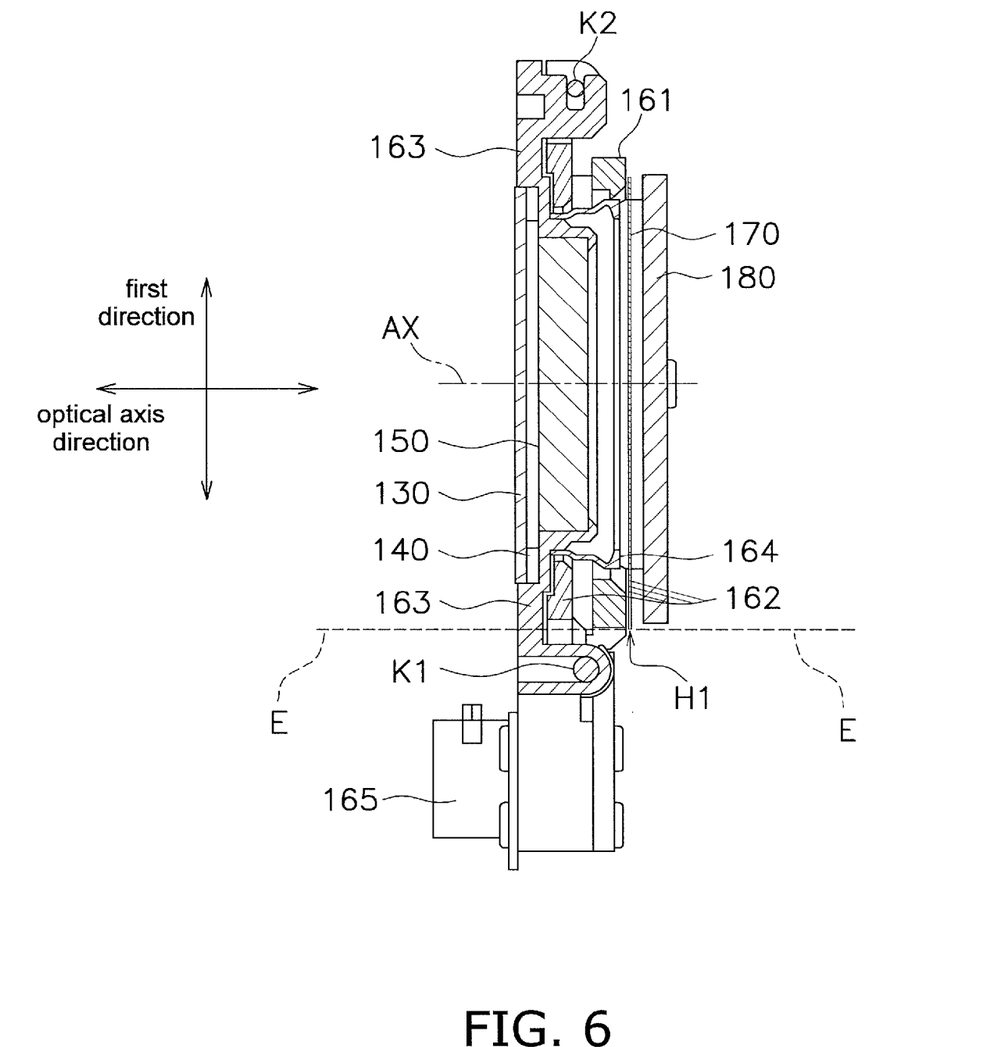
FIG. 6 is a cross section along the C-C line in FIG. 4.
Figure 7:
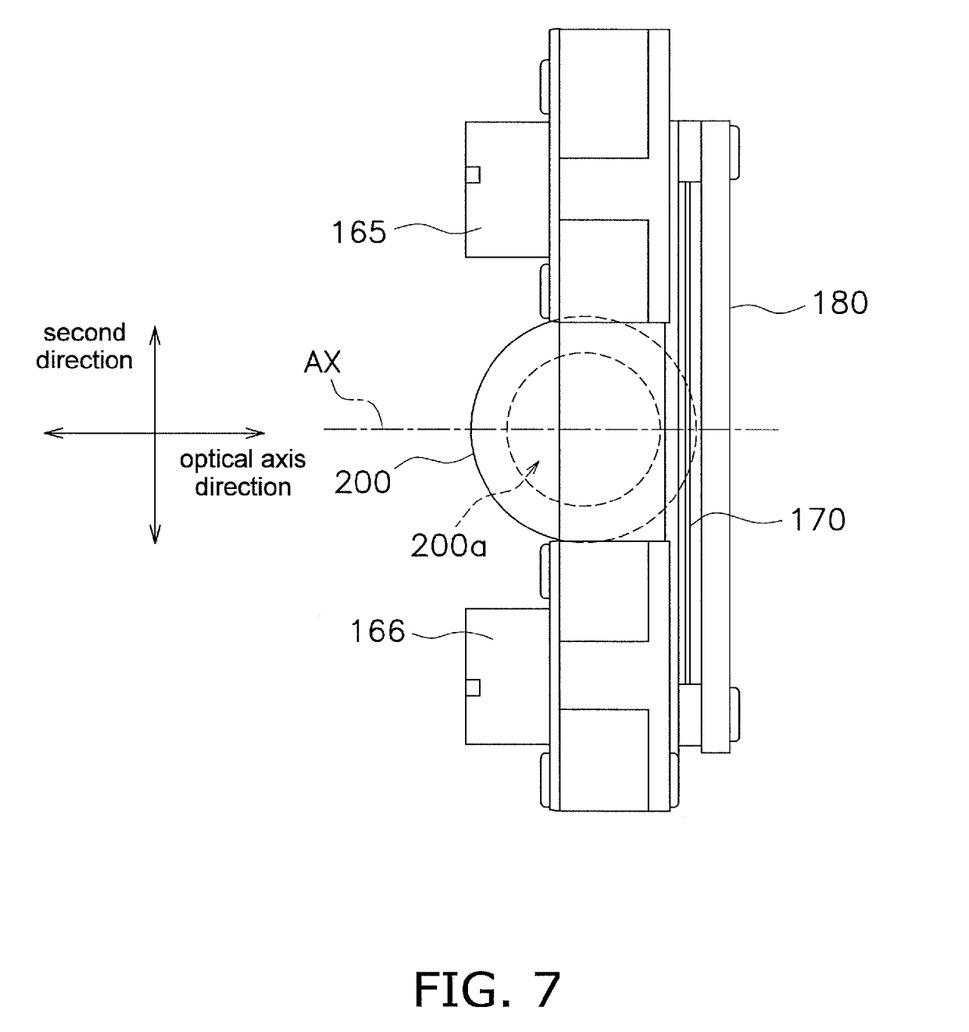
FIG. 7 is a top view of the configuration of an image blur correcting mechanism pertaining to a first embodiment.

Next, the configuration of the image blur correcting mechanism will be described through reference to the drawings. FIG. 4 is a front see-through view of the image blur correcting mechanism 160. FIG. 5 is a cross section along the B-B line in FIG. 4. FIG. 6 is a cross section along the C-C line in FIG. 4. FIG. 7 is a top view of the image blur correcting mechanism 160. The leg seat 200 is shown in FIGS. 4 and 7.

The light receiving face 170S of the imaging element 170 includes a first edge H1 and a second edge H2. The first edge H1 and second edge H2 are at a right angle to each other. The first edge H1 and second edge H2 are perpendicular to the optical axis AX of the lens unit. In this embodiment, the first edge H1 is the left edge of the light receiving face 170S, while the second edge H2 is the bottom edge of the light receiving face 170S.

As discussed above, the image blur correcting mechanism 160 has the pitch frame 161, the yaw frame 162, the fixed frame 163, the dust cover 164, a pitch actuator 165 (one example of a first actuator), and a yaw actuator 166 (one example of a second actuator).

As shown in FIGS. 5 and 6, the imaging element 170 is fixed to the pitch frame 161. The pitch frame 161 is supported by the yaw frame 162 so as to be able to move in a direction parallel to the first edge H1 (hereinafter referred to as the "first direction").

The yaw frame 162 supports the pitch frame 161 movably in the first direction. As shown in FIGS. 4 and 5, the yaw frame 162 has a pitch main shaft J1 and a pitch sub-shaft J2. The pitch main shaft J1 and pitch sub-shaft J2 are disposed along the first direction. The yaw frame 162 is supported by the fixed frame 163 so as to be able to move in a direction parallel to the second edge H2 (hereinafter referred to as the "second direction").

The fixed frame 163 supports the yaw frame 162 movably in the second direction. As shown in FIGS. 4 and 6, the fixed frame 163 has a yaw main shaft K1 and a yaw sub-shaft K2. The yaw main shaft K1 and yaw sub-shaft K2 are disposed along the second direction. The fixed frame 163 is fixed inside the holding chamber L by a fastener (not shown).

The dust cover 164 is made of rubber or another such elastic material. The dust cover 164 is press-fitted to the fixed frame 163, and is lightly pressed against the light receiving face 170S by bending to the pitch frame 161 side. The dust cover 164 surrounds the space between the diaphragm 130 and the imaging element 170, and thereby reduces the amount of dust and so forth that finds its way into this space.

The pitch actuator 165 is attached to the lower-right of the yaw frame 162. The pitch actuator 165 imparts drive force to the pitch frame 161, and thereby moves the pitch frame 161 in the first direction along the pitch main shaft J1 and the pitch sub-shaft J2. The configuration of the mechanism by which the drive force is transmitted from the pitch actuator 165 to the pitch frame 161 (hereinafter referred to as the "drive force transmission mechanism") will be discussed below.

The yaw actuator 166 is attached to the lower-left of the fixed frame 163. The yaw actuator 166 imparts drive force to the yaw frame 162, and thereby moves the yaw frame 162 in the second direction along the yaw main shaft K1 and the yaw sub-shaft K2. The configuration of the drive force transmission mechanism from the yaw actuator 166 to the yaw frame 162 will be discussed below.

Actuator Layout

Next, the layout of the pitch actuator 165 and the yaw actuator 166 will be described through reference to FIGS. 4 to 7.

First, as shown in FIG. 4, the pitch actuator 165 and the yaw actuator 166 are disposed on opposite sides of the imaging element 170, using as a reference a first perpendicular plane E that passes through the second edge H2 and is perpendicular to the first edge H1. Specifically, the pitch actuator 165 and yaw actuator 166 are disposed on the outside (the lower side) of the second edge H2 in the first direction. Accordingly, the pitch actuator 165 and yaw actuator 166 are disposed between the imaging element 170 and the lower face $S_4$ (see FIG. 3).

Also, as shown in FIGS. 4 and 5, the pitch actuator 165 is disposed on the opposite side from the yaw actuator 166, using as a reference a second perpendicular plane F that is perpendicular to the second edge H2. Specifically, the second perpendicular plane F is sandwiched between the pitch actuator 165 and yaw actuator 166. In this embodiment, the second perpendicular plane F passes through the optical axis AX of the lens unit (that is, the approximate center of the light receiving face 170S). Also, the second perpendicular plane F is an intersecting plane that intersects the concave portion 200a of the leg seat 200.

As shown in FIGS. 4 and 6, the position of the pitch actuator 165 in the first direction overlaps the position of the yaw actuator 166 in the first direction. Specifically, the disposition area of the pitch actuator 165 in the first direction overlaps the disposition area of the yaw actuator 166 in the first direction. Also, the spacing between the pitch actuator 165 and the imaging element 170 in the first direction is substantially the same as the spacing between the yaw actuator 166 and the imaging element 170 in the first direction.

In this embodiment, the term "overlap" includes the idea of at least part of each of the two members overlapping in a certain direction.

Also, as shown in FIG. 4, the position of the pitch actuator 165 in the second direction overlaps the position of the fixed frame 163 in the second direction. Similarly, the position of the yaw actuator 166 in the second direction overlaps the position of the fixed frame 163 in the second direction. Specifically, the disposition area of the pitch actuator 165 in the second direction overlaps the disposition area of the fixed frame 163 in the second direction. Similarly, the disposition area of the yaw actuator 166 in the second direction overlaps the disposition area of the fixed frame 163 in the second direction. Also, in the second direction, the pitch actuator 165 and the yaw actuator 166 are disposed between the two ends of the fixed frame 163.

As shown in FIG. 4, the position of the pitch actuator 165 in the second direction overlaps the position of the imaging element 170 in the second direction. Similarly, the position of the yaw actuator 166 in the second direction overlaps the position of the imaging element 170 in the second direction. Specifically, the disposition area of the pitch actuator 165 in the second direction overlaps the disposition area of the imaging element 170 in the second direction. Similarly, the disposition area of the yaw actuator 166 in the second direction overlaps the disposition area of the imaging element 170 in the second direction. Also, in the second direction, the inner end (left end) of the pitch actuator 165 overlaps the imaging element 170, and the inner end (right end) of the yaw actuator 166 overlaps the imaging element 170.

As shown in FIGS. 5 to 7, the position of the pitch actuator 165 in the optical axis direction overlaps the position of the yaw actuator 166 in the optical axis direction. Specifically, the disposition area of the pitch actuator 165 in the second direction overlaps the disposition area of the fixed frame 163 in the second direction. Also, the spacing between the imaging element 170 and the pitch actuator 165 in the optical axis direction is substantially the same as the spacing between the imaging element 170 and the yaw actuator 166 in the optical axis direction. In other words, the spacing between the first perpendicular plane E and the pitch actuator 165 in the first direction is substantially the same as the spacing between the first perpendicular plane E and the yaw actuator 166 in the first direction.

Further, as shown in FIGS. 4 and 7, the pitch actuator 165 is disposed on the opposite side from the yaw actuator 166, using as a reference the second perpendicular plane F that intersects the concave portion 200a of the leg seat 200. Specifically, the concave portion 200a is sandwiched between the pitch actuator 165 and the yaw actuator 166. The pitch actuator 165 and the yaw actuator 166 are disposed symmetrically around the concave portion 200a. Accordingly, the spacing between the second perpendicular plane F and the pitch actuator 165 in the second direction is substantially the same as the spacing between the second perpendicular plane F and the yaw actuator 166 in the second direction.

Configuration of Drive Force Transmission Mechanism

Figure 8:
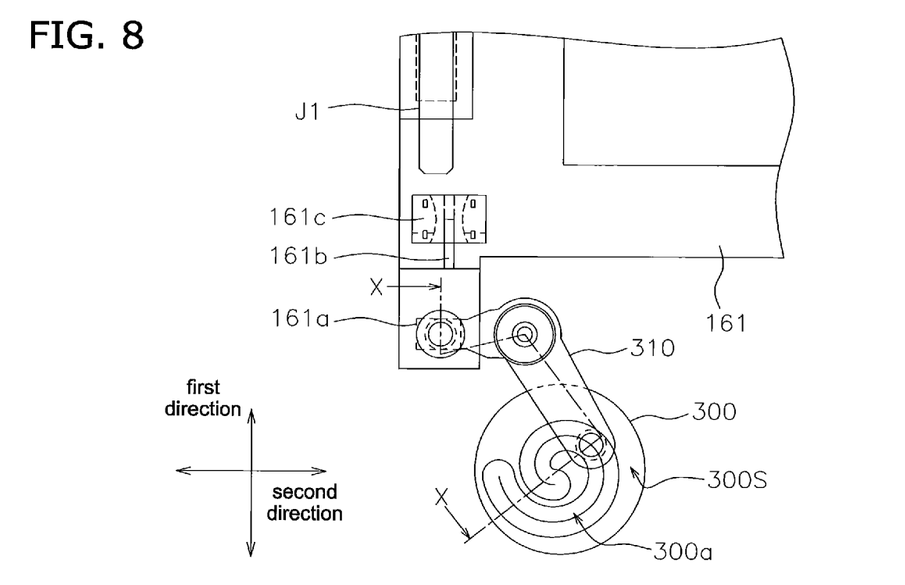
FIG. 8 is a detail enlargement of FIG. 4.
Figure 9:
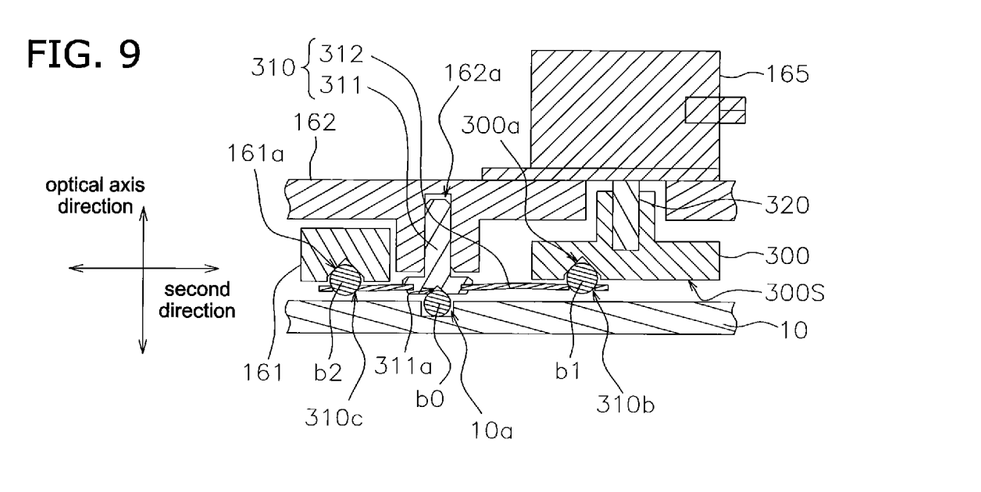
FIG. 9 is a cross section along the X-X line in FIG. 8.

Next, the drive force transmission mechanism will be described through reference to the drawings. However, the drive force transmission mechanism from the pitch actuator 165 to the pitch frame 161 has the same configuration as the drive force transmission mechanism from the yaw actuator 166 to the yaw frame 162. Therefore, just the drive force transmission mechanism from the pitch actuator 165 to the pitch frame 161 will be described below. FIG. 8 is a detail enlargement of FIG. 4. FIG. 9 is a cross section along the X-X line in FIG. 8. Only part of the housing 10 is shown in FIG. 9.

As shown in FIG. 8, the drive force transmission mechanism is constituted by a plane cam 300 and a drive lever 310.

As shown in FIG. 9, the plane cam 300 is press-fitted onto a drive shaft 320 of the pitch actuator 165. The plane cam 300 has an opposing face 300S that is opposite the housing 10. A spiral cam groove 300a is formed in the opposing face 300S. The spiral cam groove 300a has a V-shaped cross section.

The drive lever 310 is constituted by a drive lever shaft 311 and a leaf spring 312. The drive lever shaft 311 is inserted into a fixing hole 162a of the yaw frame 162. The drive lever shaft 311 has a tiny gap between itself and the fixing hole 162a. The drive lever shaft 311 is provided along the optical axis direction. The drive lever 310 is able to rotate around the drive lever shaft 311.

Here, a conical hole 311a formed in a conical shape is formed in the front end of the drive lever shaft 311. A center ball b0 is sandwiched between the conical hole 311a and a circular hole 10a in the housing 10. The circular hole 10a in the housing 10 is formed as a circular cylinder in the inner face of the housing 10.

The leaf spring 312 is fixed to the front end of the drive lever shaft 311. A first hole 310b is formed in the end of the leaf spring 312 on the plane cam 300 side. A first ball b1 is sandwiched between the first hole 310b and the spiral cam groove 300a. A second hole 310c is formed in the end of the leaf spring 312 on the pitch frame 161 side. A second ball b2 is sandwiched between the second hole 310c and a driven groove 161a formed in the pitch frame 161. The driven groove 161a has a V-shaped cross section formed along the second direction. The leaf spring 312 presses the first ball b1 and the second ball b2 against the spiral cam groove 300a and the driven groove 161a, respectively.

Also, the housing 10 is screwed to the yaw frame 161.

With the above configuration, a roller bearing is constituted by the center ball b0, the first ball b1, and the second ball b2, which affords a drive transmission mechanism that requires extremely little drive force and produces very little rattling.

Therefore, there is less transmission loss of the drive force from the pitch actuator 165 to the pitch frame 161.

Also, the drive shaft 320 is arranged along the optical axis direction. Accordingly, the pitch actuator 165 and the yaw actuator 166 produce rotational torque (drive force) around the optical axis direction.

The pitch frame 161 can return to its home position when the position of a pitch home blade 161b is detected by a photointerrupter sensor 161c.

The spiral cam groove 300a is preferably constituted by a constant velocity cam profile. Consequently, the ratio between the rotational angle of the pitch actuator 165 and the amount the pitch frame 161 is driven can be set to 1:1. As a result, the drive of the pitch actuator 165 can be easily controlled. Therefore, a stepping motor or other such actuator that can be open-loop controlled can be used for the pitch actuator 165.

EFFECTS OF THE INVENTION (1) In a first embodiment, the pitch actuator 165 (an example of a first actuator) and the yaw actuator 166 (an example of a second actuator) are disposed on opposite sides of the imaging element 170, using as a reference the first perpendicular plane E that passes through the second edge H2 and is perpendicular to the first edge H1. Also, the pitch actuator 165 is disposed on the opposite side from the yaw actuator 166, using as a reference the second perpendicular plane F that is perpendicular to the second edge H2.

Accordingly, the pitch actuator 165 and the yaw actuator 166 are disposed on the outside of the second edge H2, using the second perpendicular plane F as a reference. Therefore, the image blur correcting mechanism 160 can be smaller than when the pitch actuator 165 is disposed on the outside of the first edge H1 and the yaw actuator 166 is disposed on the outside of the second edge H2. As a result, the size of the imaging device 100 can be reduced.

(2) The position of the pitch actuator 165 in the first direction overlaps the position of the yaw actuator 166 in the first direction. Accordingly, in the first direction, the pitch actuator 165 and the yaw actuator 166 can be disposed in a more compact fashion. As a result, the image blur correcting mechanism 160 can be reduced further in size.

(3) The position of the pitch actuator 165 in the second direction overlaps the position of the fixed frame 163 in the second direction. Similarly, the position of the yaw actuator 166 in the second direction overlaps the position of the fixed frame 163 in the second direction.

Accordingly, in the second direction, the pitch actuator 165 and the yaw actuator 166 can be disposed in a more compact fashion. As a result, the image blur correcting mechanism 160 can be reduced further in size.

(4) The position of the pitch actuator 165 in the second direction overlaps the position of the imaging element 170 in the second direction. Similarly, the position of the yaw actuator 166 in the second direction overlaps the position of the imaging element 170 in the second direction.

Accordingly, the pitch actuator 165 and the yaw actuator 166 are closer together, so they can be disposed in a more compact fashion in the second direction. As a result, the image blur correcting mechanism 160 can be further reduced in size.

(5) The position of the pitch actuator 165 in the optical axis direction overlaps the position of the yaw actuator 166 in the optical axis direction.

Accordingly, in the optical axis direction, the pitch actuator 165 and the yaw actuator 166 can be disposed in a compact fashion. As a result, the image blur correcting mechanism 160 can be further reduced in size.

(6) The drive shaft 320 of the pitch actuator 165 and the yaw actuator 166 is disposed along the optical axis direction, perpendicular to the light receiving face 170S.

An ordinary actuator has a slender tubular shape extending in the draft shaft direction, so if the drive shaft 320 of each actuator lies along the optical axis direction, the actuators can be disposed more compactly in the first and second directions. As a result, the image blur correcting mechanism 160 can be further reduced in size.

(7) The pitch actuator 165 is disposed on the opposite side from the yaw actuator 166, using as a reference the intersecting plane that intersects with the concave portion 200a of the leg seat 200 (that is, the second perpendicular plane F).

Accordingly, the concave portion 200a can be formed between the pitch actuator 165 and the yaw actuator 166. As a result, the pitch actuator 165, the yaw actuator 166, and the concave portion 200a can be disposed compactly overall. As a result, the image blur correcting mechanism 160 can be further reduced in size.

Second Embodiment

Next, the configuration of an imaging device pertaining to a second embodiment will be described through reference to the drawings. What is different from the first embodiment above is that the support structure of the center ball b0 in the drive transmission mechanism has been improved. The rest of the configuration is the same as that of the imaging device pertaining to the first embodiment above, so the description will focus on the differences in the drive transmission mechanism.

Figure 10:
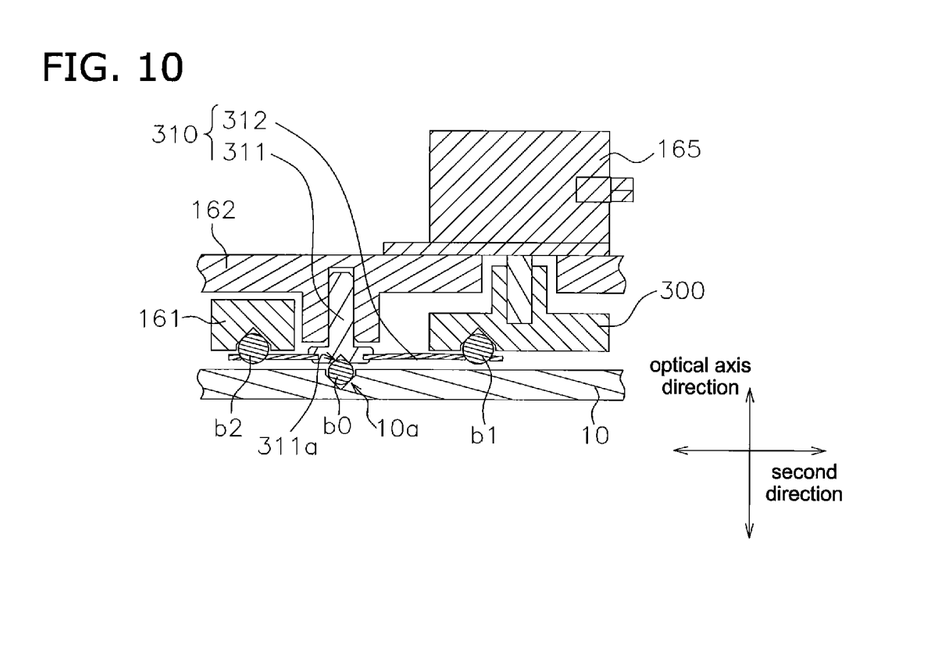
FIG. 10 is a cross section of the configuration of a drive transmission mechanism pertaining to a second embodiment.

FIG. 10 is a cross section of the configuration of the drive transmission mechanism pertaining to the second embodiment.

As shown in FIG. 10, the housing 10 has the conical hole 10a formed in the inner face of the housing 10. The conical hole 10a of the housing 10 supports the front part of the center ball b0. Also, the conical hole 311a in the drive lever shaft 311 supports the rear part of the center ball b0.

Thus, with the drive transmission mechanism pertaining to the second embodiment, the center hole b0 is supported from front and rear by the conical hole 311a of the drive lever shaft 311 and the conical hole 10a of the housing 10. Therefore, there is less rattling of the center hole b0 than when the center hole b0 is supported by a cylindrical hole and the conical hole 311a (see FIG. 9). As a result, the pitch frame 161 can be driven more precisely, so the precision of image blur correction can be improved.

Third Embodiment

Next, the configuration of an imaging device pertaining to a third embodiment will be described through reference to the drawings. What is different from the second embodiment above is that the support structure of the drive lever shaft 311 in the drive transmission mechanism has been improved. The rest of the configuration is the same as that of the imaging device pertaining to the second embodiment above, so the description will focus on the support structure of the drive lever shaft 311.

Figure 11:
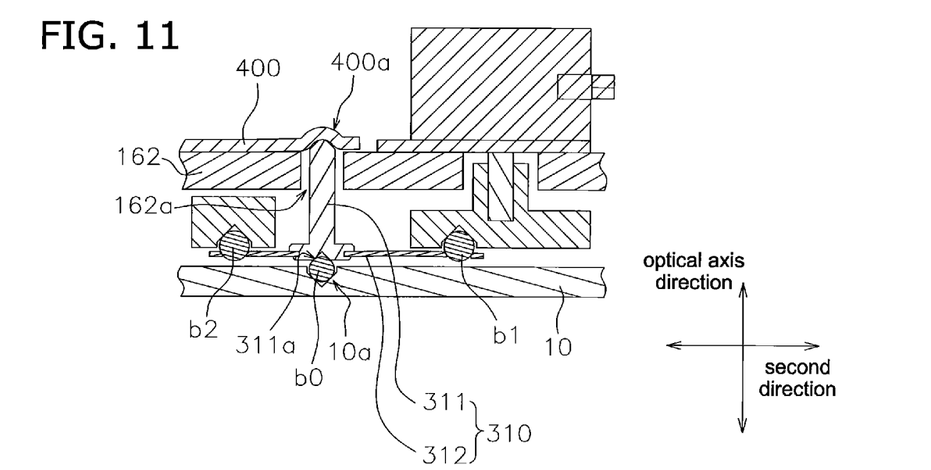
FIG. 11 is a cross section of the configuration of a drive transmission mechanism pertaining to a third embodiment.

FIG. 11 is a cross section of the configuration of a drive transmission mechanism pertaining to a third embodiment.

As shown in FIG. 11, the yaw frame 162 has an insertion hole 162a into which the drive lever shaft 311 is inserted. The drive lever shaft 311 is sufficiently separated from the inner face of the insertion hole 162a.

The drive transmission mechanism pertaining to the third embodiment comprises a leaf spring 400. The leaf spring 400 is disposed opposite the inner face of the housing 10 to the rear of the yaw frame 162. The leaf spring 400 has a support recess 400a that supports the rear end of the drive lever shaft 311. The spring force that the leaf spring 400 imparts to the rear end of the drive lever shaft 311 is sufficiently greater than the spring force imparted to the front end of the drive lever shaft 311 by the leaf spring 312 of the drive lever 310.

Thus, with the drive transmission mechanism pertaining to the third embodiment, the rear end of the drive lever shaft 311 is supported by the support recess 400a of the leaf spring 400, and the front end of the drive lever shaft 311 is supported by the center hole b0 fitted into the conical hole 311a. Specifically, the front and rear of the drive lever shaft 311 are supported by a pivot bearing. Therefore, there is less rattling of the drive lever shaft 311 than when the drive lever shaft 311 is supported by shaft fitting (see FIGS. 9 and 10). As a result, the pitch frame 161 can be driven more precisely, so the precision of image blur correction can be improved.

Fourth Embodiment

Next, the configuration of an imaging device pertaining to a fourth embodiment will be described through reference to the drawings. What is different from the first embodiment above is that the support structure of the drive lever shaft 311 in the drive transmission mechanism has been improved. The rest of the configuration is the same as that of the imaging device pertaining to the first embodiment above, so the description will focus on the support structure of the drive lever shaft 311.

Figure 12:
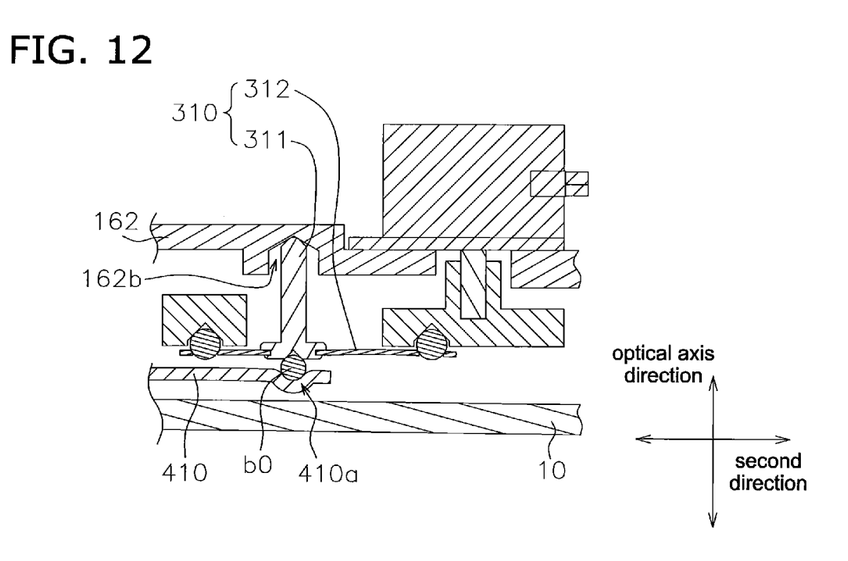
FIG. 12 is a cross section of the configuration of a drive transmission mechanism pertaining to a fourth embodiment.

FIG. 12 is a cross section of the configuration of a drive transmission mechanism pertaining to a fourth embodiment.

As shown in FIG. 12, the yaw frame 162 has a conical recess 162b into which is inserted the rear end of the drive lever shaft 311. The conical recess 162b supports the rear end of the drive lever shaft 311. Also, the center axis of the conical recess 162b coincides with the center axis of the drive lever shaft 311.

Here, the drive transmission mechanism pertaining to the fourth embodiment comprises a leaf spring 410. The leaf spring 410 is disposed opposite the inner face of the housing 10 to the inside of the housing 10. The leaf spring 410 has a support recess 410a that supports the front part of the center hole b0. The spring force that the leaf spring 410 imparts to the center hole b0 is sufficiently greater than the spring force imparted to the front end of the drive lever shaft 311 by the leaf spring 312 of the drive lever 310.

Thus, with the drive transmission mechanism pertaining to the fourth embodiment, the rear end of the drive lever shaft 311 is supported by the conical recess 162b of the yaw frame 162, and the front end of the drive lever shaft 311 is supported by the support recess 410a of the leaf spring 410. Specifically, the front and rear of the drive lever shaft 311 are supported by a pivot bearing. Therefore, there is less rattling of the drive lever shaft 311 than when the drive lever shaft 311 is supported by shaft fitting (see FIGS. 9 and 10). As a result, the pitch frame 161 can be driven more precisely, so the precision of image blur correction can be improved.

Other Embodiments

The present invention is described by the embodiment above, but this should not be interpreted to mean that the text and drawings that form part of this disclosure limit this invention. Various substitute embodiments, working examples, and implementation techniques will probably be obvious to a person skilled in the art from this disclosure.

(A) In the above embodiment, the pitch actuator 165 and the yaw actuator 166 are disposed between the fixed frame 163 and the lower face $S_4$ of the housing 10, but the present invention is not limited to this.

For example, the pitch actuator 165 and the yaw actuator 166 may be disposed between the fixed frame 163 and the upper face $S_2$ or a side face.

(B) Although not touched upon in the above embodiment, the disposition of the pitch frame 161 and the yaw frame 162 can be switched around. Similarly, the disposition of the pitch actuator 165 and the yaw actuator 166 can be switched around.

(C) In the above embodiment, the "movable frame" that is capable of relative movement with respect to the fixed frame 163 is constituted by two members, namely, the pitch frame 161 and the yaw frame 162, but the present invention is not limited to this. The "movable frame" may instead be constituted by a single member, or by three or more members.

If the movable frame is constituted by a single member, the fixed frame 163 may support the movable frame movably in the first and second directions. In this case, the pitch actuator 165 and the yaw actuator 166 may be attached to the fixed frame 163 and the movable frame, respectively.

(D) In the above embodiment, the imaging element 170 is able to move in a first direction parallel to the first edge H1 and in a second direction parallel to the second edge H2, but the present invention is not limited to this. The first direction may be any direction, and the second direction may be any direction that intersects the first direction.

Thus, the present invention of course includes various embodiments and the like that are not discussed herein. Therefore, the technological scope of the present invention is not limited to just the specific inventions pertaining to the appropriate claims from the descriptions given above.

General Interpretation of Terms

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" and "element" when used in the singular can have the dual meaning of a single part or a plurality of parts. Accordingly, these terms, as utilized to describe the present invention, should be interpreted relative to the image blur correcting mechanism and imaging device.

The term "configured" as used herein to describe a component, section, or part of a device implies the existence of other unclaimed or unmentioned components, sections, members or parts of the device to carry out a desired function.

The terms of degree such as "substantially," "about," and "approximately" as used herein mean a reasonable amount of deviation of the modified term such that the end result is not significantly changed. While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An image blur correcting mechanism comprising:
   an imaging element including a light receiving face having a first edge and a second edge, the second edge intersecting the first edge;
   a movable frame configured to hold the imaging element;
   a fixed frame configured to movably support the movable frame along a first direction and a second direction,
   the second direction intersecting the first direction,
   the first direction and second direction parallel to the light receiving face;
   a first actuator configured to move the movable frame in the first direction, the first actuator including a first drive shaft;
   a second actuator configured to move the movable frame in the second direction, the second actuator including a second drive shaft;
   a first perpendicular plane disposed at a right angle to the first edge and coincident with the second edge;
   a second perpendicular plane disposed at a right angle to the second edge; and
   an optical axis direction disposed perpendicular to the light receiving face;
   wherein the first actuator and the second actuator are disposed on an opposing side from the imaging element relative to the first perpendicular plane,
   the first actuator and the second actuator are positioned on opposing sides of the second perpendicular plane, and are positioned on opposing sides of the imaging element during image capture,
   the first drive shaft and the second drive shaft are parallel to the optical axis direction,
   the movable frame includes a first movable frame and a second movable frame,
   the first movable frame holds the imaging element,
   the second movable frame movably supports the first movable frame in the first direction,
   the fixed frame movably supports the second movable frame in the second direction,
   the first actuator is attached to the second movable frame, and
   the second actuator is attached to the fixed frame.

2. The image blur correcting mechanism according to claim 1, wherein:
   the second direction is parallel to the second edge, and
   the first actuator and the second actuator are aligned with each other when viewed in the second direction.

3. The image blur correcting mechanism according to claim 1, wherein:

the first direction is parallel to the first edge, and
the first actuator and the second actuator overlap the fixed frame when viewed in the first direction.

4. The image blur correcting mechanism according to claim 1, wherein:
the first actuator and the second actuator overlap the imaging element when viewed in the first direction.

5. The image blur correcting mechanism according to claim 1, wherein:
the first and second actuators are aligned with each other on opposing sides of the optical axis.

6. The image blur correcting mechanism according to claim 1, wherein:
the first drive shaft is configured to transmit a drive force to the first movable frame,
the second drive shaft is configured to transmit a drive force to the second movable frame.

7. An imaging device comprising:
a housing defining a holding chamber, the housing providing an exterior surface of the imaging device;
an imaging element disposed in the holding chamber, the imaging element including a light receiving face having a first edge and a second edge, the second edge intersecting the first edge;
a movable frame configured to hold the imaging element;
a fixed frame configured to movably support the movable frame along a first direction and a second direction, the second direction intersecting the first direction, the first and second directions parallel to the light receiving face;
a first actuator configured to move the movable frame in the first direction;
a second actuator configured to move the movable frame in the second direction;
an intersecting plane disposed at a right angle to the second edge; and
a concave portion formed on an exterior face of the housing, disposed extending toward the interior of the housing and intersecting the intersecting plane;
wherein the first actuator and the second actuator are positioned on opposite sides of the intersecting plane, and disposed on opposing sides of the imaging element during image capture, and
a portion of the concave portion is disposed between the first actuator and the second actuator.

8. The imaging device according to claim 7, further comprising:
a reference plane perpendicular to the first edge, and coincident with the second edge;
wherein the first actuator and the second actuator are disposed on an opposing side of the reference plane from the imaging element.

9. An image blur correcting mechanism comprising:
an imaging element including a light receiving face having a first edge and a second edge, the second edge intersecting the first edge;
a movable frame configured to hold the imaging element;
a fixed frame configured to movably support the movable frame along a first direction and a second direction,
the first direction parallel to the first edge, and
the second direction parallel to the second edge;
a first actuator configured to move the movable frame along the first direction, and disposed overlapping the imaging element in the first direction;
a second actuator configured to move the movable frame along the second direction, and disposed overlapping the imaging element in the first direction;
a first perpendicular plane located at a right angle to the first edge and coincident with the second edge;
a second perpendicular plane located at a right angle to the second edge; and
a concave portion formed on an exterior face of the housing, disposed extending toward the interior of the housing and intersecting the second perpendicular plane;
wherein the first actuator and the second actuator are disposed on an opposing side from the imaging element relative to the first perpendicular plane,
the first actuator and the second actuator are positioned on opposing sides of the second perpendicular plane,
the first actuator and the second actuator are positioned on opposing sides of the imaging element during image capture, and
a portion of the concave portion is disposed between the first actuator and the second actuator.

* * * * *